March 21, 1972  J. WEISFELD ET AL  3,650,997
COATING COMPOSITIONS CONTAINING EPOXY RESINS AND
CARBOXYL TERMINATED POLYESTERS
Filed Aug. 13, 1970

INVENTORS
JOSEPH WEISFELD
ALFRED M. TRINGALI
JOSEPH F. ACKERMAN
JOSEPH J. BERNARDO

BY Philip A. Arvidson

ATTORNEY

3,650,997
COATING COMPOSITIONS CONTAINING EPOXY RESINS AND CARBOXYL TERMINATED POLYESTERS

Joseph Weisfeld, Fair Lawn, Alfred M. Tringali, Parsippany, Joseph F. Ackerman, Cedar Grove, and Joseph J. Bernardo, Lodi, N.J., assignors to Immont Corporation, New York, N.Y.
Continuation-in-part of application Ser. No. 710,656, Mar. 5, 1968. This application Aug. 13, 1970, Ser. No. 63,352
Int. Cl. C08g *39/10, 45/14;* C09d *3/66*
U.S. Cl. 260—21                                            11 Claims

ABSTRACT OF THE DISCLOSURE

Improved coating compositions comprising a blend of an epoxy resin and a polyester having a terminal carboxyl functionality between about two and four. The preferred polyester is the esterification product of (1) a hydroxyl terminated polyester and (2) a carboxylic acid-containing monoanhydride composition made up of a mixture of trimellitic anhydride and dodecenylsuccinic anhydride. Cratering of coatings has been very substantially reduced by use of terminally located dodecenylsuccinic anhydride-produced side chains on the polyester. Cratering is still further reduced and solubility parameters are improved by employing a glycidyl ester of a tertiary carboxylic acid, such as Cardura E, in the preparation of the hydroxyl terminated polyester.

CROSS REFERENCE TO RELATED APPLICATION

This application is a continuation-in-part of U.S. application Ser. No. 710,656, now U.S. Pat. No. 3,548,026, which was filed on Mar. 5, 1968 by the same inventors and was entitled Coating Composition Containing Epoxy Resins and Carboxyl Terminated Polyesters. The disclosure of that application is incorporated herein by reference.

BACKGROUND OF THE INVENTION

Field of the invention

This application relates to compositions useful in coil coating. Coil coating is a method of precoating particularly adapted to use on metal sheeting, which is usually sold to fabricators in the form of coils. Coil coated metals are used, for example, to fabricate aluminum and steel sidings, the interior of bottle caps, gutters for homes, and cabinets for appliances such as washers and dryers. Coil coated products, their general compositions and uses, and the method of applying coil coatings are more particularly described in the brochure "The Outside and Inside Story of Coil Coated Steel," published in April 1969, by the American Iron and Steel Institute, 150 East 42nd Street, New York, N.Y. 10017. The disclosure of that brochure is incorporated herein by reference.

Some of the criteria which are necessary for an acceptable coil coating composition are extreme flexibility, leveling, rapid curing, acceptable hardness, and lack of cratering.

DESCRIPTION OF THE PRIOR ART

The parent application, which is described above under the heading Cross Reference to Related Application, disclosed certain coil coating compositions comprising a blend of an epoxy resin and a polyester. These compositions were disclosed as having particularly excellent flexibility. Furthermore, some slight mention was made of a tendency away from cratering by certain of these compositions. However, the mechanism by which cratering could be avoided was not fully understood. The present application represents the product of further research which has resulted in the positive identification of specific compositions which avoid cratering and also in modifications of earlier-disclosed compositions which are even more effective in the avoidance of cratering and which furthermore possess the advantages of improved solubility parameters.

U.S. Pat. 3,397,254 to Wynstra is exemplary of the state of the art regarding carboxyl terminated polyester compositions. Wynstra discloses, by way of example, the reaction of propylene glycol and isophthalic acid to form a hydroxyl-terminated polyester. Wynstra also discloses the reaction of trimellitic anhydride with the hydroxyl terminated polyester to form a carboxyl terminated polyester. Wynstra further discloses the possible use of small amounts of dibasic acid anhydride (such as phthalic anhydride) in conjunction with the tribasic acid anhydride (trimellitic anhydride, for example) to lower the carboxyl functionality of the resulting polyester. Wynstra, however, obviously did not appreciate the significance of the use of certain long chain dibasic acid anhydrides such as dodecenylsuccinic anhydride to form terminal side chains on the carboxyl terminated polyester and substantially reduce the incidence of cratering in the finished coating.

SUMMARY OF THE INVENTION

The inventors have now found that the use of certain aliphatic side chains in terminal positions on carboxyl terminated polyesters results in significant reduction in the incidence of cratering in the finished coil coating. They have also found that further reduction in cratering can be achieved by the use of certain glycidyl esters of tertiary carboxylic acids in the preparation of the hydroxyl terminated polyester.

The preferred side chain producing material is dodecenylsuccinic anhydride and the preferred glycidyl ester is Cardura E, a product of Shell Chemical Company. Cardura E is described in Shell's Technical Information Bulletin entitled "Cardura E Ester," dated August 1962, the disclosure of which is incorporated herein by reference. It has the formula

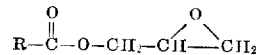

where R is a saturated $C_8$–$C_{10}$ aliphatic branched chain hydrocarbon group.

DESCRIPTION OF THE PREFERRED EMBODIMENT

Figure 1:
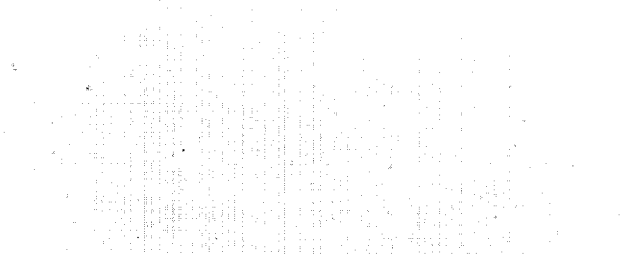
FIG. 1 of the drawing is a photograph of a coil coating formed from "an epoxy-carboxyl terminated polyester resin blend." The resin used to form this coating did not employ side chains. The small dark dots which are particularly evident at the righthand side of the photograph are craters formed in the coating during the drying of the coating. Such craters are commercially undesirable, both because of their appearance and because they are thin, vulnerable spots in the coating.

The coating compositions of our invention comprise an organic solvent solution of an epoxy resin blended with a linear polyester having a terminal carboxyl functionality between about two and four. By this we mean straight chain, substantially unbranched polyesters having between two and four carboxyl groups per molecule attached to the chain ends. Furthermore, it is preferable that the polyesters be substantially free of non-terminal carboxyl groups.

The carboxyl terminated polyesters employed in the blends of this invention are the esterification product of (1) a preformed polyester, derived from a dicarboxylic acid with a stoichiometric excess of a diol (this prepolyester is substantially hydroxyl terminated with few or no terminal carboxyl groups) with (2) an excess of a reactive component made up of a mixture of tricarboxylic acid anhydride and $C_8-C_{22}$ alkyl or alkenyl succinic anhydride. In order to achieve a coating which is substantially free from cratering, the amount of $C_8-C_{22}$ alkyl or alkenyl succinic anhydride employed in the mixture should be between 2 and 25% by weight of the resulting carboxyl terminated polyester, preferably 5–10%. The preferred materials for use in the mixture are trimellitic anhydride and dodecenylsuccinic anhydride.

The use of a carboxylic acid containing anhydride component is critical to the practice of this invention. Its use makes possible the formation of linear polyesters having a terminal carboxyl functionality of more than two.

Let us consider why such properties are necessary. If a carboxyl terminated linear polyester were produced by the esterification of diols and only dicarboxylic acids or their anhydrides, the resulting linear polyester could obviously only have a maximum of two terminal carboxyl groups per molecule. Such polyesters when blended with the epoxy resins were found to give coatings which were less tough and had a lower abrasion and solvent resistance than the blends of this invention. On the other hand, if a carboxyl terminated polyester were produced by the esterification of a triol or higher polyol with a dicarboxylic acid or its anhydride, the resulting polyester could have more than two terminal carboxyl groups per molecule but would be branched (i.e. non-linear). Such polyesters when blended with the epoxy resins were found to give coatings which were deficient in the degree of flexibility required for the coating to withstand during fabrication of screw tops or bottle caps.

If a tricarboxylic acid which did not contain an anhydride group, for example, trimellitic acid, were used, a linear carboxyl-terminated polyester giving the properties of the compositions of this invention could not be produced. The three carboxylic acid groups of the trimellitic acid are substantially equally reactive, and require a higher temperature to esterify with hydroxyl groups than the carboxylic acid-containing monoanhydrides of this invention. Thus, even if trimellitic acid in place of a carboxylic acid-containing anhydride was esterified with a hydroxyl terminated prepolyester formed from a dicarboxylic acid and an excess of diol, the higher esterification temperature would produce a non-linear extensively branched structure with all three carboxyl groups participating in the esterification. Such polyesters when blended with the epoxy resins would likewise give coatings which were deficient in the high degree of flexibility required for the coating to the metal surface during fabrication of screw tops and bottle caps.

The prepolyesters operable in the present invention are linear polyesters derived from a dicarboxylic acid and a diol. Such prepolyesters are substantially hydroxyl-terminated with few or no carboxyl groups and have a molecular weight range from about 200 to 10,000. In order to achieve the hydroxyl termination in the prepolyester, a stoichiometric excess of the diol is used over the dicarboxylic acid, from about 1.02 to 2.00 moles of diol, preferably from about 1.03 to 1.3 moles, being used, for each mole of dicarboxylic acid.

Although the hydroxyl-terminated polyesters used in the present invention were prepared by the direct esterification of hydroxyl groups with carboxylic acid groups, other polyesterification procedures, such as transesterification and double decomposition, may be employed.

Among suitable diols that can be used in the formation of the prepolyester are any of the conventional diols such as ethylene glycol, propylene glycol, butylene glycol, neopentyl glycol, 1,5-pentanediol, 1,6-hexanediol. Also suitable are the ether diols such as diethylene glycol, dipropylene glycol, triethylene glycol, tetraethylene glycol, polyethylene glycol, polypropylene glycols and polybutylene glycols. Monoepoxides such as ethylene, propylene and butylene oxide can be used in place of diols to form the prepolyester, as can caprolactone. The terminology "diol" as used in this application includes these materials.

Illustrative of suitable dicarboxylic acids which can be employed in preparing the prepolyester are aromatic acids such as phthalic acid, isophthalic acid, terephthalic acid; aliphatic acids such as succinic acid, glutaric acid, adipic acid, pimelic acid, suberic acid, azelaic acid, sebacic acid; unsaturated dicarboxylic acids such as maleic acid, fumaric acid as well as anhydrides of these acids. Mixtures of the above acids are also operable.

One carboxylic acid containing monoanhydride operable in preparing the carboxyl terminated polyesters of this invention is trimellitic anhydride. When trimellitic anhydride is reacted with a substantially hydroxyl-terminated prepolyester at a temperature below 175° C., the free carboxyl group of the carboxyl-containing anhydride does not undergo esterification. Only the anhydride group reacts forming an esterification linkage with a terminal hydroxyl group at the prepolyester chain end and further forming a second unreacted carboxyl group at the chain end. Since the temperature is too low for the carboxyl groups to undergo further esterification, there are two terminal carboxyl groups for each molecule of trimellitic anhydride reacted with the hydroxyl terminated prepolyester. With two terminal hydroxyl groups on the prepolyester molecule, a maximum of four terminal carboxyl groups on the final polyester molecule is possible when trimellitic anhydride alone is esterified with the hydroxyl terminated prepolyester. When the monoanhydride composition which is esterified with the hydroxyl-terminated prepolyester is a mixture of the trimellitic anhydride and an anhydride of a dicarboxylic acid, the number of terminal carboxyl groups in the resulting polyester molecule will vary from more than 2 up to 4 depending on the proportions of the trimellitic and dicarboxylic acid anhydrides used. One equivalent weight of the monoanhydride composition based upon anhydride group content is reacted with each equivalent weight of the prepolyester based upon hydroxyl content.

The number of terminal carboxyl groups per molecule of the linear carboxyl-terminated polyester which may also be referred to as the terminal carboxyl functionality of the polyester may be calculated in accordance with the following formula:

$$F_t = Af_a + B + C$$

where:

$F_t$ = terminal carboxyl functionality of the final polyester.
A = number moles of polyacid monoanhydride/mole prepolymer.
$f_a$ = number free carboxylic groups/mole of poly-acid monoanhydride.
B = number moles of monoanhydride e.g. phthalic, maleic anhydride/mole of prepolymer.
C = number moles of free carboxylic groups in prepolymer/mole prepolymer.

where:

$$A + B = 2 - C$$

As we have previously set forth, while the prepolyester is preferably substantially hydroxyl-terminated, the compositions of this invention would be operable even if the prepolyester had some terminal carbonyl groups. Therefore the carboxyl functionality of the prepolyester should be determined in the conventional manner.

It should be noted that if in place of trimellitic anhydride there is used a polyanhydride, i.e., an anhydride with more than one anhydride group such as pyromellitic anhydride, the product of esterification with the hydroxyl terminated prepolyester is a polyester with terminal anhydride groups and carboxyl groups which are not terminal but positioned along the chain. Such a polyester when blended with the epoxy resins would give coatings which are deficient in the high degree of flexibility required for the coating to adhere to the metal surface during the fabrication of screw caps etc.

With respect to the monoanhydride composition which reacts with the hydroxyl-terminated prepolyester, while dodecenylsuccinic anhydride was used for illustration in combination with the carboxylic acid containing monoanhydride, other $C_8$–$C_{22}$, preferably $C_8$–$C_{18}$, alkyl and alkenyl succinic anhydrides may be used such as tetradecenyl succinic anhydride, hexadecenyl succinic anhydride, and octadecenyl succinic anhydride. For best results in the blends of this invention, it is preferred that the dicarboxylic acid anhydride is used in such proportion that the resulting carboxyl terminated polyester has a functionality of from 2.5 to 3.5.

The epoxy resins or polyepoxides used in this invention are preferably resins produced by the reaction of a polyhydric phenol, particularly p,p′-dihydroxy diphenyl dimethyl methane with epichlorohydrin in accordance with the procedure of U.S. Pat. No. 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of p,p′-dihydroxydiphenyl dimethylmethane, a higher weight polyepoxide resin may be produced. The polyepoxide resins produced by the reaction of epichlorohydrin and p,p′-dihydroxy diphenyl dimethylmethane may in addition be esterified with vegetable oil fatty acids including coconut acids, cottonseed acids, dehydrated castor fatty acids, linseed oil fatty acids, oiticia fatty acids, soy acids and tung fatty acids.

Other polyepoxides which may be used in the practice of this invention are the epoxidized esters of polyethylenically unsaturated monocarboxylic acids such as epoxidized linseed, soybean and dehydrated castor oil.

Diglycidyl esters of dibasic acids such as adipic, azelaic, sebacic, phthalic, heaxhydrophthalic acid may also be used.

Another group of epoxy-containing materials which may be used includes the epoxidized esters of unsaturated monohydric alcohols and polycarboxylic acids e.g., di-(2,3-epoxybutyl) adipate or di-(2,3′-epoxyhexyl) succinate.

Another group includes epoxidized derivatives of polyethylenically unsaturated polycarboxylic acids such as, for example, dimethyl 8,9,12,13-diepoxyeiconsanediate or dibutyl 7,8,11,12-diepoxyoctadecanedioate.

Also operable are the epoxidized polyethylenically unsaturated hydrocarbons such as epoxidized 2,2-bis(2-cyclohexanyl) propane or epoxidized vinyl cyclohexane.

Epoxidized novolacs prepared by reacting epichlorohydrin with phenol-formaldehyde novolac resins are also applicable in the practice of this invention.

In general, the epoxy resins suitable for use in this invention have an epoxide equivalent between about 43 and 6000.

The coating compositions of this invention comprise blends of carboxyl terminated polyesters and epoxy resins in volatile organic solvents. Illustrative of the solvents which may be employed are ketones, such as methyl ethyl ketone, isophorone, mesityl oxide; substituted glycols such as ethylene glycol monomethyl ether, ethylene glycol monomethyl ether acetate, ethylene glycol monoethyl ether acetate, diethylene glycol monobutyl ether acetate, glycol diacetate, as well as benzyl alcohol, p-dioxane, 2-nitropropane, bis(2-methoxyethyl) ether, and chlorobenzene. While the coating composition may be made up entirely of the previously described solvents and resin components, it may be desirable to replace some of the above-mentioned solvents with less expensive materials to reduce the cost of the final coating composition. Illustrative of the less expensive solvents which may be employed are toluene, xylene as well as other high boiling aromatic petroleum fractions.

Preferably from 0.5 to 2.0 equivalents of epoxy material are blended with each part of carboxyl terminated polyester.

The blend of the carboxyl terminated polyester and epoxy resins preferably contains as a catalyst, a metal salt of an organic acid such as metal acetates, octoates, oleates or naphthenates. The metal may be cobalt, chromium, manganese, nickel, iron, magnesium, cerium or zinc.

In accordance with another aspect of the present invention, it has been found that the rate of curing may be enhanced by blending with the compositions of this invention, from about 5–40% by weight, preferably 10–30% of an amine-aldehyde resin as a third component. These weight percents are based on the solids content of the resultant three component blend. The amine-aldehyde resins or condensates and ethers thereof which must be compatible with the other two components are preferably triazine formaldehyde resins, including melamine formaldehyde resins such as the hexamethyl ether of hexamethylol melamine, which is most preferable. The melamine-formaldehyde resin also yields a coating of enhanced solvent resistance.

The terminology "terminally located" or similar language is used in this application to describe the location of the side chains formed by reaction of dodecenylsuccinic anhydride or similar materials with OH groups on the prepolyester molecule. This terminology as used herein means that the carboxyl group and the side chain are attached to the same terminal carbon atom on the carboxyl terminated polyester molecule. The following formula will further illustrate the meaning of this terminology.

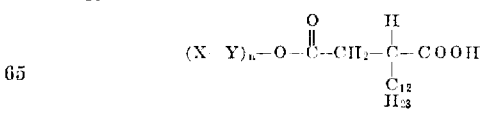

The —COOH group is, of course, the carboxyl termination of the molecule. The $C_{12}H_{23}$ group is the side chain formed from dodecenylsuccinic anhydride. $(X—Y)_n$ represents the main polyester molecule, where X—Y schematically represents the reaction product of a diol and a dicarboxylic acid or anhydride.

Referring more particularly to the drawing, the resins employed in the coating formulations of FIGS. 1, 2 and 3 were prepared in accordance with Examples 1, 2 and 3, respectively, below. All parts are by weight.

EXAMPLE 1

A hydroxyl terminated prepolyester was formed from the reaction of the following components:

| Prepolyester | Moles | Parts |
| --- | --- | --- |
| Isophthalic acid | 0.475 | 139.3 |
| Phthalic anhydride | 0.475 | 123.7 |
| Diethylene glycol | 1.0 | 186.5 |

The prepolyester was formed by reacting the diethylene glycol, isophthalic acid and phthalic anhydride under a nitrogen atmosphere at 240° to 245° C. for three to four hours with 20 parts of xylene present. The water given off was removed by azeotropic distillation. The reaction was continued at the same temperature for a total of 28 hours. The prepolyester thus formed had a hydroxyl number of 24.5, an acid number of 1.7 and a molecular weight of 4290.

The following were then reacted at 150° C. for about three hours:

| | Moles | Parts |
| --- | --- | --- |
| Above prepolyester | 1 | 4,290 |
| Trimellitic anhydride | 0.825 | 158.5 |
| Phthalic anhydride | 1.045 | 148 |

The resulting carboxyl terminated polyester had a terminal carboxyl functionality of 2.83 and had no side chains.

EXAMPLE 2

A hydroxyl terminated prepolyester was formed by reacting the following components in the manner described below:

| Prepolyester | Moles | Parts |
| --- | --- | --- |
| Phthalic anhydride | 4.275 | 632 |
| Dodecenylsuccinic anhydride | 0.475 | 126.4 |
| Isophthalic acid | 4.75 | 792 |
| Diethylene glycol | 10.0 | 1,060 |

The four components of the prepolyester were heated under a nitrogen atmosphere in a three-necked flask equipped with thermometer-thermoregulator, Trubore stirrer, and a steam condenser surmounted by a Dean-Stark trap, which in turn was surmounted by a water cooled Allihn condenser. Distillate was collected and when distillation slowed appreciably the steam condenser was removed, the trap filled with xylene and sufficient xylene was added to maintain reflux. Ten parts of xylene and 0.46 part of tetrabutyl titanate catalyst were added. The esterification was continued at 240° C. under nitrogen atmosphere until the desired acid number of five or less was reached.

The prepolyester thus formed was then reacted with the following materials in the same manner described in Example 1.

| | Moles | Parts |
| --- | --- | --- |
| Above prepolyester | 1 | 5,830 |
| Trimellitic anhydride | 1.071 | 205.5 |
| Phthalic anhydride | 0.78 | 115.5 |

The resulting polyester had a terminal carboxyl functionality of 3.07 and had randomly positioned side chains derived from the dodecenylsuccinic anhydride.

EXAMPLE 3

The same prepolyester was prepared as used in Example 1. The prepolyester was then reacted with the following quantities of trimellitic anhydride and dodecenylsuccinic anhydride at 150° C. for about three hours.

| | Moles | Parts |
| --- | --- | --- |
| Above prepolyester | 1 | 4,290 |
| Trimellitic anhydride | 0.844 | 162 |
| Dodecenylsuccinic anhydride | 1.026 | 274 |

The resulting carboxyl terminated polyester had a carboxyl functionality of 2.84 and had terminally positioned side chains derived from the dodecenylsuccinic anhydride.

Figure 2:
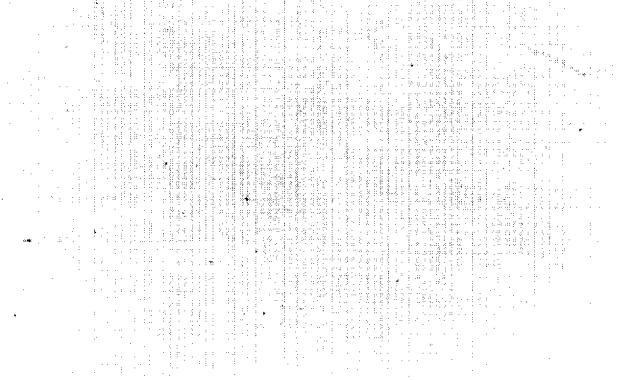
FIG. 2 also shows a coating formed from an epoxy-carboxyl terminated polyester resin blend. The resin blend of this figure differed from that of FIG. 1 only in that the resin blend used to form this coating had aliphatic side chains, formed from coreaction of dodecenylsuccinic anhydride with the hydroxyl groups at random positions on the polyester molecule. Other than the use of this different resin blend, the formulation, application and photography of the coating were carried out in the same manner as FIG. 1. Fewer craters are apparent as a result of the use of this resin blend.
Figure 3:
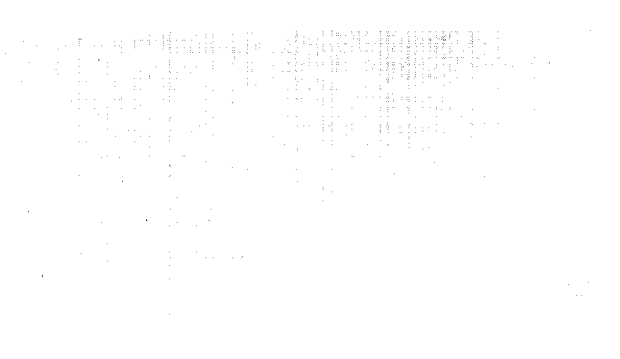
FIG. 3 shows another coating formed from an epoxy-carboxyl terminated polyester resin blend. The resin blend of this figure differed from that of FIGS. 1 and 2 only in that this resin blend had terminally positioned aliphatic side chains, formed from dodecenylsuccinic anhydride, on the polyester molecule. The coating is virtually free from craters. Other than the use of this particular resin blend, the formulation, application and photography of the coating were carried out in the same manner as FIGS. 1 and 2.

The coatings shown in FIGS. 1-3 were formulated from the polyesters of Examples 1-3, respectively, in substantially the same manner as the following example. The manner of preparation of each of the coatings was the same except for the substitution of a different resin corresponding to each figure.

EXAMPLE 4

48.78 parts of the carboxyl terminated polyester of Example 1 were combined with 47.80 parts of Titanox CLNC titanium dioxide pigment and 3.42 parts of ethylene glycol diacetate. These materials were ground on a conventional three-roll grinding mill and were then let down with 7.57 additional parts of the carboxyl terminated polyester, 2.16 parts of Cymel 301, 4.03 parts of Epon 828, 5.11 parts of 8% zinc octoate in Cellosolve acetate and 8.25 parts of Panasol AN-1.

Cymel 301 is essentially the hexamethyl ether of hexamethylol melamine and is available from American Cyanamid Co. Epon 828 is a bisphenol A-epichlorohydrin resin having an epoxide equivalent weight of 180–205. Panasol AN-1 is a high boiling aromatic petroleum hydrocarbon fraction marketed by Amoco Chemicals Corp.

The pigmented formulation was applied by conventional coil coating techniques to 25 mil Alodine 1200 S treated aluminum panels and cured at 500° F. for 30 seconds to yield the 1 mil (dry thickness) coating shown in FIG. 1. The carboxyl terminated polyesters of Examples 2 and 3 were similarly pigmented, formulated and cured to produce the coatings of FIGS. 2 and 3, respectively.

As will be clearly seen from the figures, the terminal location of the aliphatic side chains on the polyester molecule is critical to the preparation of coatings which result in a very low incidence of cratering.

Although the use of side chains formed from dodecenylsuccinic anhydride results in a low incidence of cratering and a significant improvement over the materials described in most of the examples of the parent application, the composition of the following example resulted in a still more significant reduction in cratering.

EXAMPLE 5

| Prepolyester: | Parts |
| --- | --- |
| Diethylene glycol | 802.0 |
| 1,4 butanediol | 180.0 |
| Isophthalic acid | 1745.0 |
| Cardura E | 360.0 |

The above materials were heated to 230°–240° C. under a nitrogen atmosphere using a packed column to prevent unnecessary loss of volatile diols. After 6–18 hours and at an acid number less than 7, the reaction was stopped. 89 parts of trimellitic anhydride and 157 parts of dodecenylsuccinic anhydride were added and the reaction continued at 150° C. for three hours. The resulting product had an acid number in the range from 45 to 57.

The carboxyl terminated polyester thus formed was formulated into a coating composition in the manner described in Example 4. This coating composition was found to have significantly improved flow properties (i.e. good leveling and no cratering) when compared to that formulated from Example 3, the next best material. Furthermore, the solubility parameter range of this resin was wider than that of the resin of Example 3. Thus, lower cost solvents can be used with the resin of Example 5.

Although dodecenylsuccinic anhydride was employed to form side chains in the above examples, similar coatings were also formulated having side chains formed from octyl and octenyl succinic anhydride and octadecyl and octadecenyl succinic anhydride and many materials in between these chain lengths.

A description of solubility parameters and the manner of determining same can be found in the following literature references:

(1) Burrell H.—Official Digest 27, 726 (October 1955) (J. of Paint Tech. and Eng.)
(2) Burrell H.—Official Digest 27, 726 (November 1957) (J. of Paint Tech. and Eng.)
(3) Small, P. S.—J. Appl. Chem. 3, 75 (1953)
(4) Crowley, J. D. et al. J. Paint Tech. 38, 269 (May 1966)
(5) Gordon, J. L. J. Paint Tech. 38, 43 (January 1966)

The improved coating compositions of this invention can best be cured by exposing the coated substrate to a temperature between about 350 and 550° F. for a period of from about 30 to 120 seconds.

We claim:
1. A composition of matter comprising a blend of
 (A) 0.5 to 2.0 equivalent weights of an epoxide resin having an epoxide equivalent between about 43 and 6000, and
 (B) 1.0 equivalent weight of a carboxyl terminated polyester having between about 2 and 4 terminal carboxyl groups per molecule and comprising the reaction product of:
  (a) a mixture of $C_8$–$C_{22}$ alkyl or alkenyl succinic anhydride and a tricarboxylic anhydride, where the alkyl or alkenyl succinic anhydride comprises from about 2 to 25% by weight of the resulting carboxyl terminated polyester, with
  (b) a prepolyester having a molecular weight of from about 200 to 10,000 formed by reacting an excess of a diol, a monoepoxide or caprolactone with dicarboxylic acid or anhydride.

2. The composition of claim 1 wherein the blend is dissolved in an organic solvent and the resulting solution is capable of forming a flexible coating when deposited on a surface and cured.

3. The organic solvent solution of claim 2 wherein the alkenyl anhydride is dodecenylsuccinic anhydride.

4. The organic solvent solution of claim 3 wherein the prepolyester forming reaction additionally contains a glycidyl ester of a tertiary carboxylic acid.

5. The organic solvent solution of claim 4 wherein the glycidyl ester has the formula

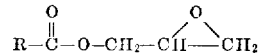

where R is a saturated $C_8$–$C_{10}$ aliphatic branched chain hydrocarbon group.

6. The composition of claim 1 wherein the blend additionally comprises:
 (C) from about 5–40% by weight, based on the total solids content of the resultant blend, of a compatible amine-aldehyde resin.

7. A substrate carrying a substantially crater-free coating comprising the dried residue of the composition of claim 1.

8. A substrate carrying a substantially crater-free coating comprising the dried residue of the composition of claim 3.

9. A substrate carrying a substantially crater-free coating comprising the dried residue of the composition of claim 4.

10. A substrate carrying a substantially crater-free coating comprising the dried residue of the composition of claim 5.

11. A substrate carrying a substantially crater-free coating comprising the dried residue of the composition of claim 6.

References Cited
UNITED STATES PATENTS

| | | | |
|---|---|---|---|
| 3,397,254 | 8/1968 | Wynstra et al. | 260—835 |
| 3,268,477 | 8/1966 | Mueller | 260—47 |
| 3,268,483 | 8/1966 | Klootwijk et al. | 260—75 |
| 3,408,421 | 10/1968 | Kurka | 260—830 |
| 3,468,704 | 9/1969 | Graver | 117—161 |

DONALD E. CZAJA, Primary Examiner

R. W. GRIFFIN, Assistant Examiner

U.S. Cl. X.R.

117—132 BE, 161K, 161 ZB; 260—22 EP, 32.4, 32.8 EP, 33.2 EP, 33.4 EP, 33.6 EP, 3.8 EP